United States Patent [19]

Maehara et al.

[11] Patent Number: 4,697,902
[45] Date of Patent: Oct. 6, 1987

[54] DEVICE FOR CONTAINING A RADIATION RECORDING MEDIUM

[75] Inventors: Yasunori Maehara, Tochigi; Sigemi Fujiwara; Katsuhide Koyama, both of Ootawara; Kaoru Tamura, Odawara; Yasuhiro Kawai; Kazuya Watanabe, both of Minami-ashigara, all of Japan

[73] Assignees: Kabushiki Kaisha Toshiba; Fuji Photo Film Co., Ltd., both of Japan

[21] Appl. No.: 830,929

[22] Filed: Feb. 19, 1986

[30] Foreign Application Priority Data

Feb. 20, 1985 [JP] Japan .................. 60-33086
Feb. 20, 1985 [JP] Japan .................. 60-33087

[51] Int. Cl.⁴ .................. G03B 17/26; B65D 85/30
[52] U.S. Cl. .................. 354/281; 206/455
[58] Field of Search .................. 354/276–279, 354/281–285, 288; 250/475.2, 485.1; 206/455; 312/50; 292/163; 402/2

[56] References Cited

U.S. PATENT DOCUMENTS

| | | | |
|---|---|---|---|
| 723,116 | 3/1903 | Woodruff | 402/2 |
| 909,459 | 1/1909 | Schmuck | 354/284 X |
| 2,114,638 | 4/1938 | Parker | 354/277 |
| 2,573,655 | 10/1951 | Schwartz et al. | 354/281 |
| 3,491,671 | 1/1970 | Engeldrum | 354/288 |
| 4,008,483 | 2/1977 | Swift et al. | 206/455 X |
| 4,275,814 | 6/1981 | Kageyama et al. | 206/455 |
| 4,295,565 | 10/1981 | Takeuchi | 206/455 |

FOREIGN PATENT DOCUMENTS

| | | |
|---|---|---|
| 2634163 | 2/1978 | Fed. Rep. of Germany . |
| 2750599 | 5/1978 | Fed. Rep. of Germany . |
| 1316181 | 5/1973 | United Kingdom .............. 206/455 |

Primary Examiner—Donald A. Griffin
Attorney, Agent, or Firm—Finnegan, Henderson, Farabow, Garrett & Dunner

[57] ABSTRACT

A device for containing a radiation recording medium includes an opening through which the recording medium is placed and a light shutting plate for closing the opening to prevent light from penetrating into the casing. A light shutting plate is provided integral with a handle. A locking mechanism is provided for bringing a casing into locking engagement with the light shutting plate. Since the device is moved by holding the handle with the light shutting plate locked on the casing, there is no possibility that the film will be inadvertently exposed to light with the shutter plate left unclosed.

19 Claims, 15 Drawing Figures

DEVICE FOR CONTAINING A RADIATION RECORDING MEDIUM

BACKGROUND OF THE INVENTION

This invention relates to a device for containing a radiation recording medium for recording an image by a radiation.

A feed magazine or a take-up magazine mounted on, for example, an X-ray diagnostic apparatus is known as this type of device. The feed magazine contains unexposed X-ray films which are taken sheet by sheet therefrom and supplied to a photographing unit for X-ray shot. On the other hand, a take-up magazine sequentially stores X-ray films therein.

Figure 1:
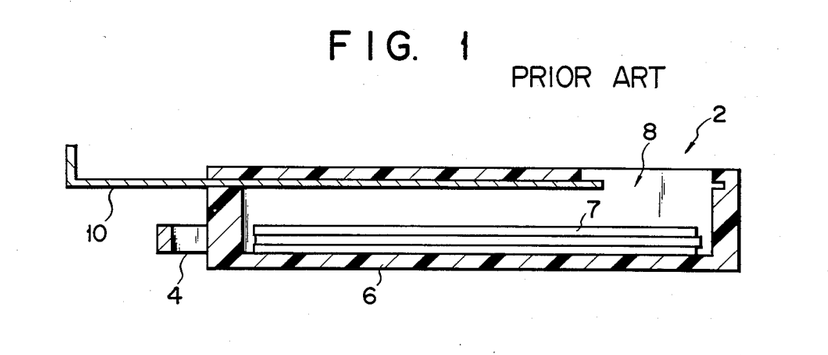
FIG. 1 is a longitudinal cross-sectional view diagrammatically showing a conventional film magazine.

With reference to FIG. 1, conventional magazine 2 as a feed magazine or a take-up magazine comprises a casing 6 integral with handle 4 and light shutting plate 10 adapted to close film access window 8 to prevent the passage of light into the casing. X-ray films 7 in the casing are protected from external light. Where magazine 2 is attached to an X-ray diagnostic apparatus, it is necessary to withdraw light shutting plate 10 and thus to open access window 8.

Since the conventional film magazine 2 is formed integral with the handle 4, there is a risk that it will be withdrawn from the X-ray diagnostic apparatus with light shutting plate 10 inadvertently left unclosed. In this case, film 7 is subject to light exposure, making unexposed films in the film magazine useless. If, on the other hand, the film is already exposed with an image X-ray, then the X-ray image on the film is erased from the film.

SUMMARY OF THE INVENTION

It is accordingly the object of this invention to provide a device for containing a recording medium, which can prevent a recording medium from being inadvertently exposed due to an operator's operation error.

According to this invention there is provided an apparatus for containing a recording medium, which comprises:

a casing having an opening through which the recording medium is placed therein;

a light shutting plate for closing the opening to prevent light from penetrating into the casing, the light shutting plate is removable from the casing;

a handle integrated with the light shutting plate; and a locking mechanism which, when the light shutting plate closes the opening of the casing, brings the light shutting plate into locking engagement with the casing.

DETAILED DESCRIPTION OF THE PREFERRED EMBODIMENTS

The embodiments of this invention will be explained with reference to FIGS. 2 to 15.

Figure 2:
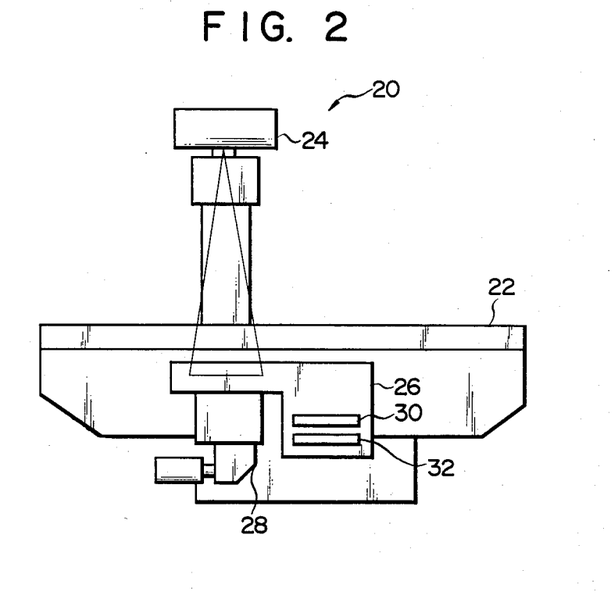
FIG. 2 is an elevational view diagrammatically showing an X-ray diagnostic apparatus to which a film magazine of this invention is attached.

FIG. 2 shows X-ray diagnostic apparatus 20 for use in connection with the embodiment of this invention. X-ray diagnostic apparatus 20 includes bed or table 22 on which a human subject (e.g. a patient) lies and X-ray tube 24 disposed above the bed and adapted to generate an X-ray for exposure on the human subject. Spot shot unit 26 is disposed below the bed to X-ray the human subject and image system 28 is provided for permitting an X-ray which has been penetrated into the human subject to be converted to an electric signal for display. Film magazines 30, 32 of this invention are detachably mounted on spot shot unit 26.

Figure 3:
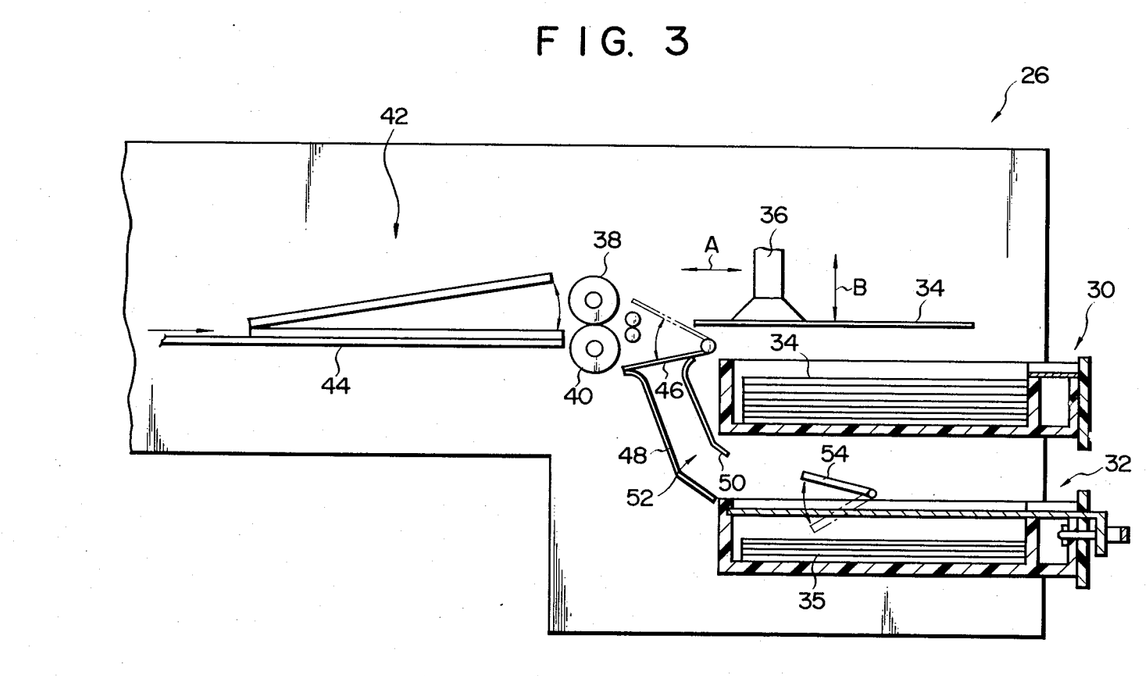
FIG. 3 is a diagrammatic, cross-sectional view showing a spot unit of the X-ray diagnostic apparatus of FIG. 2.

As shown in FIG. 3, detachable upper feed magazine 30 for feeding an unexposed film 34 and detachable lower take-up magazine 32 for receiving exposed film 35 are attached to spot shot unit 26. Above the upper feed magazine is disposed suction cup 36 which sucks a top sheet film on a sheet film stack within the upper feed magazine so that it can be taken out. The suction cup can be moved in a horizontal direction as indicated by arrows A and in a vertical direction as indicated by arrows B in FIG. 3. At a substantially middle of the spot shot unit is arranged a pair of reversely rotatable feed rollers 38, 40 which feeds the sucked film therethrough. Holder 42 is located on the feed side of feed rollers 38, 40 to hold the film from a nip between the feed rollers 38, 40 and is movable along guide 44. An intensifying screen is attached to the inside of holder 42 and the film, if held by holder 42, is intimately attached to the intensifying screen. Holder 42 is moved, along guide 44, between a wait position in which the film is held by the holder and a position in which the film is X-rayed. Rocking plate 46 is pivotally mounted at a location between feed rollers 38, 40 and feed magazine 30 so that the X-rayed film, which has been discharged from the feed rollers, may be fed into the take-up magazine 32. Passage 52 is comprised of a pair of guide plates 48, 50 and provided between rocking plate 46 and take-up magazine 32.

The operation of spot shot unit 26 will now be explained below.

Unexposed film 34 which has been sucked by suction cup 36 from the sheet film stack within feed magazine 30 is moved in the directions of arrows B and A in FIG.

3 to permit it to be fed into feed rollers 38, 40. In this connection it is to be noted that feed rollers 38, 40 are rotated in a feeding direction into the holder which is waited for the unexposed film to be held therein. When the film is held by the holder 42, the holder 42 is moved to a predetermined position where it is X-rayed. After the film has been X-rayed in the X-raying position, the holder 42 is returned to an original position in readiness for the next unexposed film. With the holder 42 in such a wait position the trailing edge portion of the X-rayed film is caught between feed rollers 38, 40. The feed rollers 38, 40 are rotated in a discharging direction to permit the film to be moved toward the side of the feed magazine 30. In this connection it is to be noted that, during this movement, rocking plate 46 swing upward to permit the film to be guided down the passage into the take-up magazine 32 where the film is, while being hit by a hitting or striking plate 54 located above the take-up magazine 32, sequentially and neatly placed on a film stack in the take-up magazine.

A first embodiment, i.e., feed and take-up magazines 30 and 32, of this invention will be explained in more detail with reference to FIGS. 4 to 10. Since feed magazine 30 is substantially the same as take-up magazine 32, an explanation will be given below with reference to the feed magazine only.

Figure 4:
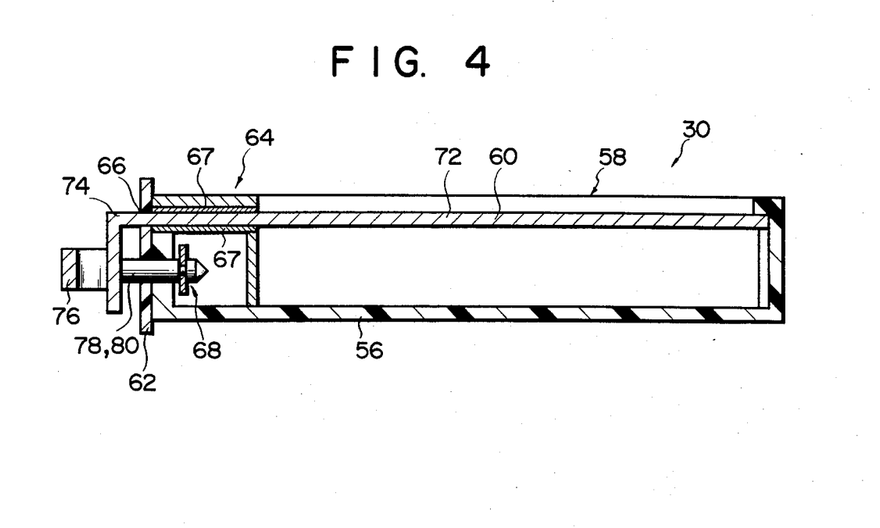
FIG. 4 is a longitudinal cross-sectional view diagrammatically showing a film magazine according to a first embodiment of this invention.
Figure 5:
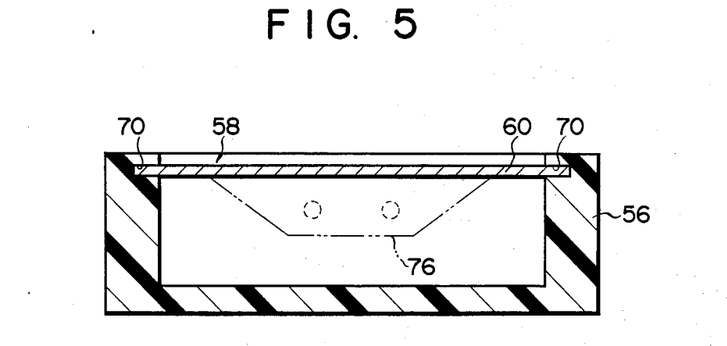
FIG. 5 is a lateral cross-sectional view diagrammatically showing a film magazine shown in FIG. 4.

As shown in FIGS. 4 and 5, feed magazine 30 comprises box-like casing 56 made of plastics and light shutting plate 60 made of aluminum and adapted to close an access opening defined at the upper side thereof. Front panel 62 is externally attached to the front face of casing 56, noting that it is wider than the front face of casing 56. Light shutting portion 64 is provided on the inside of the front of the casing so as to prevent an intrusion of light from the side of the front panel when light shutting plate 60 is withdrawn. Insertion hole 66 extends through the light shutting portion 64 and front panel 62 such that light shutting plate 60 is inserted through the insertion hole 66. A napped cloth 67 is attached to the inside of the through hole to prevent the penetration of light. Locking mechanism 68 for light shutting plate 64, as set forth below, is contained below the light shutting plate 64 such that it is located below the insertion hole 66. As shown in FIG. 5, a pair of guide grooves 70, 70 for guiding the light shutting plate 10 is formed on the inside of the casing.

Figure 8:
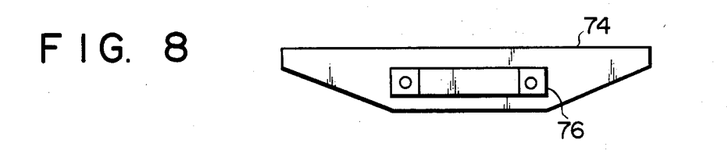
FIG. 8 is a plan view showing a light shutting plate shown in FIG. 4.
Figure 9:
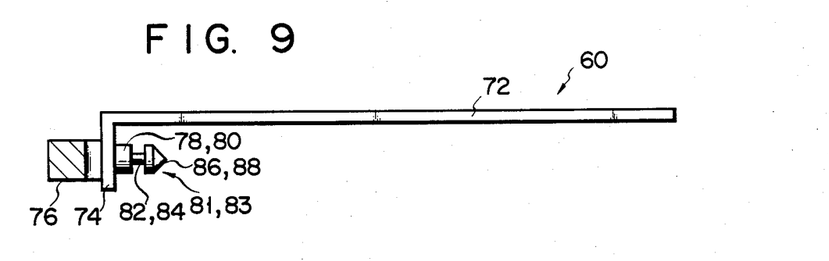
FIG. 9 is a side view showing the light shutting plate of FIG. 8.

As shown in FIGS. 8 and 9, the light shutting plate comprises substantially rectangular main plate section 72 and front section 74 bent at an angle substantially perpendicular to the main plate section 72. Handle 76 is fixed to the front section 74 of the light shutting plate 60.

The locking mechanism 68 will be explained below in connection with FIGS. 6 to 8, which brings light shutting plate 60 into locking engagement with the casing 56 when the access opening 58 of the casing 56 is closed by the light shutting plate 60. A pair of shafts 78, 80 are disposed opposite the handle such that they extend at the front section of the light shutting plate 60 in a direction substantially parallel with the main plate section 72 (See FIG. 4). The respective shaft 78, 80 has a neck 82, 84 at the distal end portion and a tapered head 86, 88. A pair of insertion holes 90, 92 each extend through the front panel 62 and front section of the casing 56 to permit the corresponding shaft to be inserted therein. As shown in FIG. 7, slide plate 100 is supported by three pins 94, 96 and 98 relative to front wall 91 of the casing 56 to be slidable along the front wall 91. Three holes 102, 104 and 106, into which pins 94, 96 and 98 are inserted, are elongated in a sliding direction with pins 94, 96 and 98 in contact therewith. The respective pins 94, 96 and 98 have heads 108, 110 and 112, respectively, each of which has a size greater than the elongated hole 102, 104, 106. Between holes 102 and 104 are provided a hole 113 into which shaft 78 is inserted. Hole 115 is provided between holes 104 and 106 with shaft 108 inserted thereinto. Spring 114 is anchored to one end of the slide plate to be urged normally in one direction, i.e., in a direction as indicated by an arrow C in FIG. 6. On the other end portion of the slide plate 100, lever 116 is fixed which extends through a hole 118 of front wall 91 and front panel 62 and extends along the side wall of the grip. Hole 118 has a size enough large to permit lever 116 to be moved therein.

The operation of locking mechanism 68 will be explained below.

When access opening 58 is to be closed, the main plate 72 of light shutting plate 60 is inserted into hole 66 in the front panel 62. Then, the shafts 78 and 80 extending through the front section 74 of light shutting plate 60 are inserted through the holes 90, 92 to permit them to abut against slide plate 100. At this time, slide plate 100 is urged by spring 114 in the direction of the arrow C in FIG. 6 with the center of holes 113 and 115 of the slide plate offset with respect to the center of shafts 78, 80, and the heads of the shafts 78, 80 are brought into engagement with holes 113 and 115, respectively. Further insertion of the light shutting plate causes slide plate 100 to be moved against the urging force of spring 114 in a direction opposite that of the arrow C in FIG. 6 due to the tapered heads of shafts 78 and 80. When the insertion of the light shutting plate is complete, the shaft heads 86, 88 are popped out with the necks of the shafts 78, 80 snap-fitted on the slide plate 100 through the holes 113, 115 of the slide plate 100, and the slide plate 100 is brought back to the original urging position by the action of spring 114. That is, the slide plate 100 is brought into locking engagement with the necks of shafts 78, 80, preventing the shafts from moving out of the slide plate 100. In this embodiment of this invention the light shutting plate is brought into locking engagement with the casing by merely operating the light shutting plate 100 by handle 76, that is, by one hand of an operator.

The light shutting plate can be withdrawn from the feed magazine in the following manner.

Figure 6:
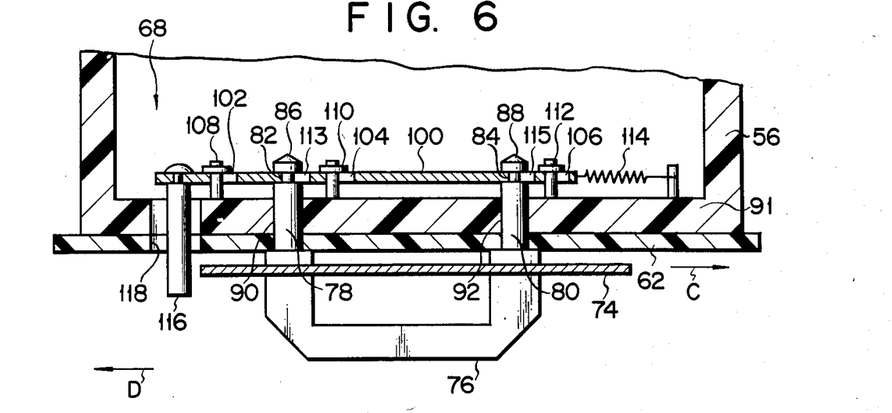
FIG. 6 is a partial, cross-sectional view showing a locking mechanism for a light shutting plate of a film magazine shown in FIG. 4.
Figure 7:
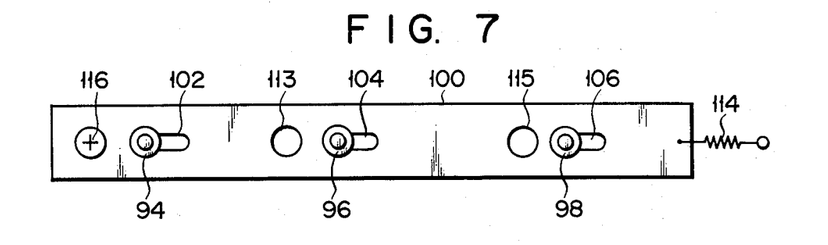
FIG. 7 is a plan view showing a slide plate of the locking mechanism shown in FIG. 6.

Lever 116 is moved against the urging force of spring 114 in a direction of an arrow D in FIG. 6 to permit holes 113 and 115 in the slide plate 100 to align with shaft heads 86 and 88. In this state, the light shutting plate 60 can be withdrawn away from the casing by pulling the handle 76 toward the operator. During the withdrawal of the light shutting plate 60 the penetration of light into the casing 56 can be positively prevented due to the napped cloth on the inner wall of the insertion hole 66 of light shutting member 64.

According to the first embodiment, unless the light shutting plate 60 is locked, the feed magazine cannot be withdrawn from the spot shot unit 26 due to the light shutting plate 60 being formed integral with the handle 76. Thus it is possible to prevent an inadvertent withdrawal of the feed magazine 30 from the spot shot unit 26.

Figure 10:
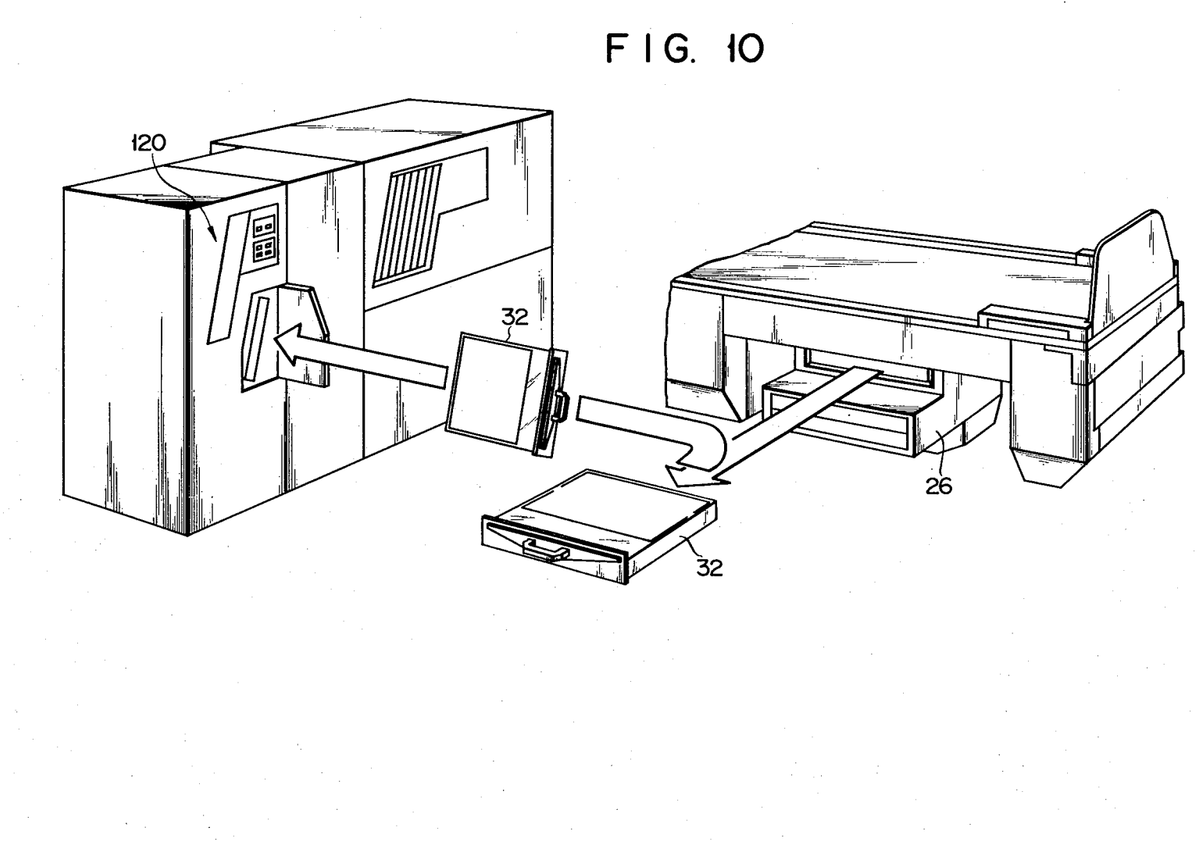
FIG. 10 is an explanatory view showing a state in which the film magazine of FIG. 4 is used.

As shown in FIG. 10, the magazine 30 or 32 is frequently attached and detached by the user, such as it is withdrawn from the snap shot unit 26 with the film X-rayed or it is mounted on image recorder 120. Thus there is no possibility that, since the light shutting plate is locked, it will been inadvertently displaced or removed during the carrying of the feed magazine.

A second embodiment of this invention will be explained below in more detail. Like reference numerals are employed in this embodiment to designate parts or elements corresponding to those shown in FIGS. 11 to 13.

Figure 11:
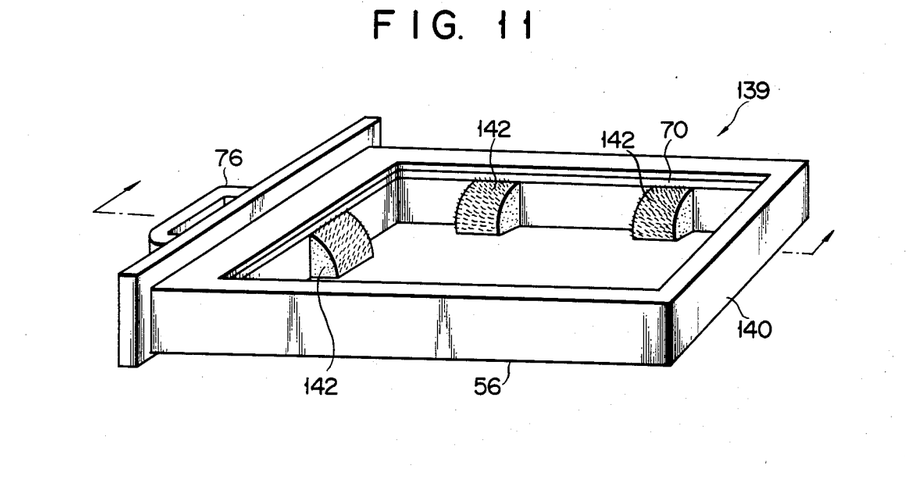
FIG. 11 is a perspective view showing a film magazine according to a second embodiment of this invention.
Figure 12:
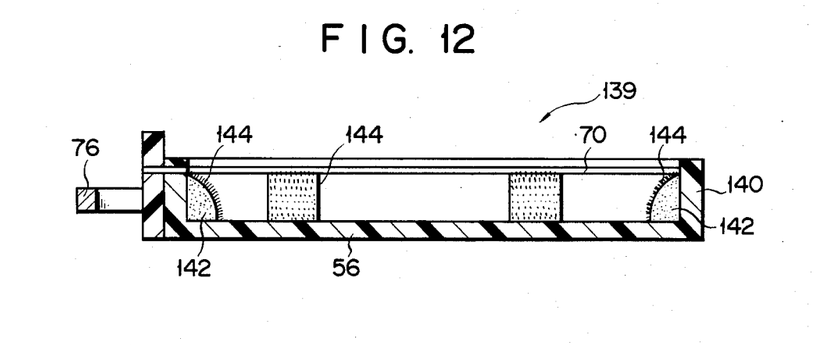
FIG. 12 is a longitudinal cross-sectional view showing the film magazine of FIG. 11.

The second embodiment of this invention is different from the first embodiment of this invention in that a film holding means is provided inside a casing 56. In feed magazine 139 of the second embodiment, holding members 142 are attached to inner wall 140 of casing 56 such that, at the locations below a guide groove 70, they project inward. The holding member 142 is formed of an elastic material, such as a sponge or urethane foam, and has a sector-like outer configuration. Black napped cloth 144 is formed on the outer peripheral surface of the sector-like outer configuration of the holding member. In feed magazine 139, two pairs of holding members 142, 142; 142, 142 are provided on the opposite inner sides of the casing with one pair of the forward end side and the other pair on the rear side of the casing.

Figure 13:
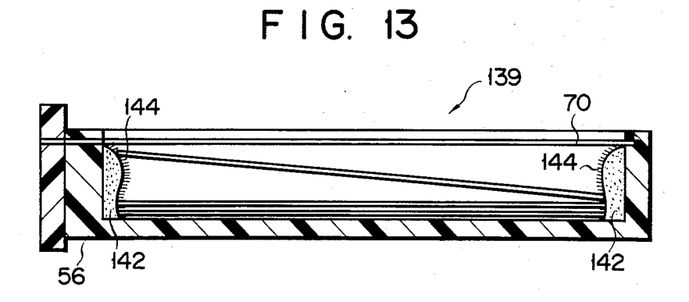
FIGS. 13 to 15 each are longitudinal cross-sectional views diagrammatically showing a modified form of the film magazine shown in FIG. 11.

In feed magazine 139 of the second embodiment, the film is inserted into the casing with the leading and trailing edges thereof moved downward under its own weight, while pressing the holding member down as shown in FIG. 13. At this time the holding member is elastically deformed by the edge portions of the film to permit the film to slowly slide down. Since an urging force acts upon the film in the casing due to the elastic deformation of the holding member 142, the sheet can be held with a proper holding force within the casing 56. Furthermore, due to the napped cloth on the surface of the holding member the film, once being received in place in the casing, is prevented from being displaced under the action of a frictional force on the nap 144 of the cloth. According to this invention the holding member 142 can accommodate the tolerance of the film due to its elastic deformation because the film to be placed within the film magazine 139 usually has a tolerance of about ±1 mm. Thus the holding member may hold the respective film in proper place. Where feed magazine 30 is carried or tilted for diagnosis or even if bed 22 is raised or lowered during diagnosis of the patient, there is no possibility that the films within the casing will be displaced or dropped. It is therefore possible to prevent a damage to the film.

Figure 14:
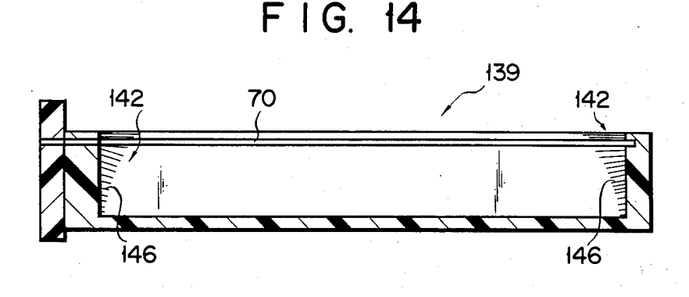
Figure 15:
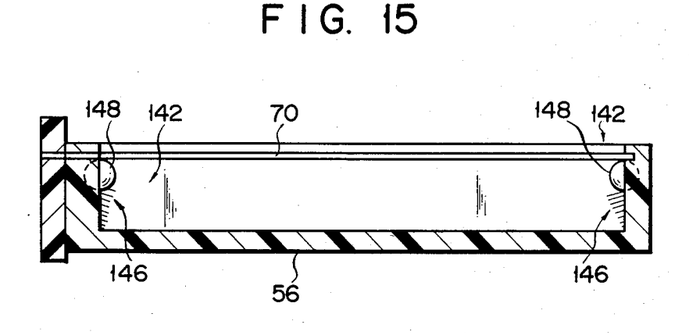

FIGS. 14 and 15 each show a modified form of the third embodiment of this invention. As shown in FIG. 14 a fiber brush 146 may be used in place of any elastic member 144 such as a sponge. In this case, the same advantage can also be gained from this modification. In this case it is preferred that the fiber brush be formed with the brush fibers directed downward and the upper fibers longer than the lower fibers. This specific arrangement of the fiber brush prevents no upward movement of the film once the film has been properly placed in the casing.

As shown in FIG. 15 use may be made, as the holding member, of a combination of fiber brush 146 and rotatable roller 148. In the arrangement shown in FIG. 16 the roller 148 is located on the upper side and the fiber brush 146 is located on the lower side on the inner wall of the casing. The modification of FIG. 15 permits a ready access to the film through the rotation of the roller.

Although in the modification of FIG. 15 the holding member 142 is located on the inner front wall side and on the inner rear wall side of the casing 56, it may be provided only on one of the inner front and rear wall sides of the casing. In this case, the same advantage can also be obtained.

This invention is not restricted to the above-mentioned embodiments and a variety of changes modifications can be made without departing from the spirit and scope of this invention.

For example, lever 116 is moved in the direction of the arrow C in FIG. 6 when the light shutting plate is to be locked on the casing 56 and in the direction of the arrow D in FIG. 6 when the light shutting plate is to be unlocked from the casing. In this case, spring 114 may be omitted. As the locking means use may be made of a hook which, when rotated by the operation of the lever, is brought into locking engagement with a portion of the light shutting plate.

Although in the above-mentioned embodiment the film is used as a radiation recording medium, the same effect can also be obtained even if use is phosphorescent sheet.

As the access opening use may be made of an opening corresponding to a whole or partial opening space, including a half opening space, of the casing for receiving the film.

What is claimed is:

1. A device for holding a radiation image recording medium, comprising:
    a casing having an opening through which the recording medium is placed therein;
    a light shutting plate for closing said opening to prevent light from penetrating into said casing, said light shutting plate being slidably insertable in and removable from said casing;
    a handle fixed to said light shutting plate; and
    locking means for bringing said light shutting plate into locking engagement with said casing at times when said light shutting plate closes said opening of said casing.

2. A device according to claim 1, in which said light shutting plate includes a main plate section for closing aaid opening of said casing and a front section bent at an angle substantially perpendicular to said main plate section, said handle being fixed to said front section.

3. A device according to claim 2, in which said locking means includes a shaft fixed to said front section of said light shutting plate and a sliding plate disposed within said casing permitting said shaft to be locked to said casing.

4. A device according to claim 3, in which said sliding plate has a hole through which said shaft is inserted, said shaft having a neck with a narrowed section at a forward end portion, whereby said neck of said shaft is brought into locking engagement with said sliding plate at times when said shaft extends through said hole.

5. A device according to claim 4, in which
    said locking means further comprises a spring connected between said casing and said sliding plate for biasing said sliding plate in one direction, and
    said shaft includes a tapered forward end, whereby said sliding plate is permitted to be moved by the action of said tapered forward end against said spring and, when said sliding plate is completely inserted in said casing, said neck of said shaft is brought into locking engagement with said sliding plate.

6. A device according to claim 1, in which said casing includes a light shutting member provided on said casing to prevent light from penetrating into the interior of said casing when said light shutting plate is inserted into said casing.

7. A device according to claim 6, in which said light shutting member includes a hole through which said light shutting member is inserted into said casing, said hole being lined with a napped cloth.

8. A device according to claim 1, in which said casing includes an access opening having a dimension greater than that of the recording medium held therein, whereby said recording medium can be taken out of said casing by lifting the recording medium upward from said casing without bending the recording medium.

9. A device according to claim 1, further comprising holding means provided on an inner wall of said casing for holding the recording medium in place within said casing.

10. A device according to claim 9, in which said holding means includes a holding member made of an elastically deformable material.

11. A device according to claim 10, in which said holding member has a sector-like outer configuration at a side surface thereof.

12. A device according to claim 10, in which at least one of said holding members is provided on an inner wall of said casing.

13. A device according to claim 12, in which said holding member is located on front and rear walls of said casing corresponding to leading and trailing edges of the recording medium.

14. A device according to claim 11, in which said holding member has a napped cloth at the side wall of said casing.

15. A device according to claim 9, in which said holding means is made of a fiber brush material.

16. A device according to claim 15, in which said fiber brush is provided across the thickness of said casing.

17. A device according to claim 16, in which said fiber brush material includes fibers curved downward.

18. A device according to claim 17, in which said holding means includes a rotatable roller located on an upper inner wall portion of said casing and a fiber brush material located below said rotatable roller on a lower inner wall portion of the casing.

19. A device for holding a radiation image recording medium in an X-ray diagnostic apparatus, comprising:
a casing having an opening through which the recording medium is placed therein, said casing being removably mounted in said X-ray diagnostic apparatus;
a light shutting plate including a main plate section for closing said opening of said casing and a front section arranged at an angle substantially perpendicular to said main plate section, said light shutting plate being removable from said casing;
a handle for detaching said casing from said X-ray diagnostic apparatus and for carrying said casing, said handle being fixed to said front section of said light shutting plate; and
locking means for bringing said light shutting plate into locking engagement with said casing at times when said light shutting plate closes said opening of said casing, whereby said casing can be removed from said X-ray diagnostic apparatus by pulling said handle only if said light shutting plate closes said opening of said casing.

* * * * *